(12) United States Patent
Borchardt et al.

(10) Patent No.: US 10,984,493 B1
(45) Date of Patent: Apr. 20, 2021

(54) AUGMENTED OR VIRTUAL REALITY TO SCENARIO PLAN PROPERTY PURCHASE OR RENOVATION

(71) Applicant: Wells Fargo Bank, N.A., San Francisco, CA (US)

(72) Inventors: Jennifer Stacey Borchardt, San Francisco, CA (US); Adam Clifford Christensen, Moraga, CA (US); Charles Cowell, Dublin, CA (US); Eduardo DeLa Torre, Oakland, CA (US); Darren M. Goetz, Salinas, CA (US); Eric David Greene, Piedmont, CA (US); Robert Glenn Hamchuk, San Jose, CA (US); Miranda C. Hill, Seattle, WA (US); Pey-Ning Huang, San Francisco, CA (US); Orsolya Oldroyd, Walnut Creek, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 265 days.

(21) Appl. No.: 15/588,099

(22) Filed: May 5, 2017

(51) Int. Cl.
    *G06Q 50/16* (2012.01)
    *G06Q 40/08* (2012.01)
    (Continued)

(52) U.S. Cl.
    CPC ....... *G06Q 50/165* (2013.01); *G06Q 30/0643* (2013.01); *G06Q 40/025* (2013.01); *G06Q 40/08* (2013.01)

(58) Field of Classification Search
    CPC ...... G06Q 50/165; G06Q 40/00; G06Q 40/06; G06Q 50/16; G06Q 10/00; G06Q 30/00;
    (Continued)

(56) References Cited

U.S. PATENT DOCUMENTS

| 6,922,701 B1 | 7/2005 | Ananian et al. |
| 7,062,722 B1 | 6/2006 | Carlin et al. |
| (Continued) | | |

FOREIGN PATENT DOCUMENTS

| AU | 2015101646 A4 | 12/2015 |
| CN | 105278663 A | 1/2016 |
| WO | 2015139086 A1 | 9/2015 |

OTHER PUBLICATIONS

Tully et al., "Internet of Things Primer for 2016," Mar. 31, 2016, 8 pages.
(Continued)

*Primary Examiner* — Alexander G Kalinowski
*Assistant Examiner* — Sanjeev Malhotra
(74) *Attorney, Agent, or Firm* — Merchant & Gould P.C.

(57) ABSTRACT

An example method for displaying renovation options for a structure includes: receiving homeowner financial information; receiving a selection of a renovation option; receiving pricing information of the renovation option; generating a financial impact analysis based on the homeowner financial information and the pricing information; displaying a renovation view on an augmented reality device, the renovation view displaying the structure with a representation of the renovation option depicted thereon; and displaying a financial impact analysis view showing the financial impact analysis, including a renovation budget amount.

19 Claims, 5 Drawing Sheets

(51) Int. Cl.
*G06Q 40/02* (2012.01)
*G06Q 30/06* (2012.01)

(58) Field of Classification Search
CPC .... G06Q 30/02; G06Q 50/08; G06Q 30/0283; H04L 67/306; Y04S 10/54; G06T 19/003; G01D 4/004
USPC ..... 705/7.38, 14.54, 35, 36 R, 37, 313, 400, 705/14.39, 7.23, 7.29; 703/1; 715/733; 345/420; 707/634
See application file for complete search history.

(56) References Cited

U.S. PATENT DOCUMENTS

| | | | |
|---|---|---|---|
| 7,277,572 B2 | 10/2007 | MacInnes et al. | |
| 8,606,657 B2 | 12/2013 | Chesnut et al. | |
| 9,652,897 B2 | 5/2017 | Osborn et al. | |
| 9,978,109 B1 | 5/2018 | Catalano | |
| 10,311,614 B2* | 6/2019 | Mowatt | G06F 3/012 |
| 2002/0010655 A1 | 1/2002 | Kjallstrom | |
| 2002/0099617 A1* | 7/2002 | Fogelson | G06Q 30/0601 705/14.39 |
| 2003/0052877 A1* | 3/2003 | Schwegler, Jr. | G06F 30/13 345/420 |
| 2003/0144936 A1* | 7/2003 | Sloan | G06Q 40/04 705/36 R |
| 2006/0089895 A1* | 4/2006 | Joye | G06Q 40/00 705/35 |
| 2006/0149687 A1* | 7/2006 | McLemore | G06Q 30/0603 705/400 |
| 2006/0190285 A1 | 8/2006 | Harris et al. | |
| 2007/0250386 A1 | 10/2007 | Wyckoff | |
| 2008/0103908 A1 | 5/2008 | Munk | |
| 2008/0162224 A1* | 7/2008 | Coon | G06Q 10/0639 705/7.38 |
| 2009/0024628 A1 | 1/2009 | Angel et al. | |
| 2011/0178906 A1* | 7/2011 | Joye | G06Q 40/00 705/35 |
| 2011/0202446 A1* | 8/2011 | Kremen | G06Q 40/00 705/37 |
| 2011/0214082 A1 | 9/2011 | Osterhout et al. | |
| 2012/0249588 A1 | 10/2012 | Tison et al. | |
| 2012/0299963 A1 | 11/2012 | Wegrzyn et al. | |
| 2013/0036371 A1 | 2/2013 | Cohen | |
| 2013/0311401 A1* | 11/2013 | Clary | G06Q 40/06 705/36 R |
| 2014/0058961 A1* | 2/2014 | McDaniel | G06Q 30/06 705/313 |
| 2014/0063063 A1 | 3/2014 | Scott et al. | |
| 2014/0095122 A1* | 4/2014 | Appleman | G06F 30/13 703/1 |
| 2014/0129948 A1* | 5/2014 | Jones | G06F 3/048 715/733 |
| 2014/0222608 A1 | 8/2014 | Cohen et al. | |
| 2014/0313226 A1 | 10/2014 | Feiner et al. | |
| 2015/0052080 A1 | 2/2015 | Letzeiser | |
| 2015/0178861 A1 | 6/2015 | Gordon et al. | |
| 2015/0242747 A1 | 8/2015 | Packes et al. | |
| 2015/0248724 A1* | 9/2015 | Snell | G06F 16/287 707/634 |
| 2015/0316985 A1 | 11/2015 | Levesque et al. | |
| 2015/0324940 A1* | 11/2015 | Samson | G06Q 10/08 705/7.23 |
| 2016/0027051 A1* | 1/2016 | Gross | G06K 9/46 705/14.54 |
| 2016/0092891 A1* | 3/2016 | Flett | H04L 63/12 705/7.29 |
| 2016/0098727 A1* | 4/2016 | Carlson | G06F 16/951 705/37 |
| 2016/0148433 A1 | 5/2016 | Petrovskaya et al. | |
| 2016/0378887 A1 | 12/2016 | Maldonado | |
| 2017/0046878 A1 | 2/2017 | Dobslaw | |
| 2017/0076365 A1* | 3/2017 | D'Souza | G06Q 50/08 |
| 2017/0132841 A1 | 5/2017 | Morrison | |
| 2017/0323378 A1* | 11/2017 | Dintenfass | G06Q 30/0645 |
| 2018/0068474 A1* | 3/2018 | Mowatt | G06F 3/04815 |
| 2019/0228553 A1* | 7/2019 | Mowatt | G06F 3/012 |

OTHER PUBLICATIONS

Velosa et al., "Hype Cycle for the Internet of Things, 2016," Jul. 14, 2016, 68 pages.
Velosa et al., "Maturity Model for the Internet of Things," Mar. 2, 2016, 18 pages.
Tully, Jim, "IoT: Key Lessons to Date and Action Plan for 2016," Feb. 12, 2016, 8 pages.
Prentice, Stephen, "The Six Forces That Will Shape Business and Technology in 2030," Feb. 1, 2016, 9 pages.
Friedman et al., "Predicts 2016: Unexpected Implications Arising From the Internet of Things," Dec. 3, 2015, 13 pages.
Cearley et al., "Top 10 Strategic Technology Trends for 2016," Feb. 29, 2016, 15 pages.
Burke et al., "Top 10 Strategic Technology Trends for 2016: Internet of Things Architecture and Platforms," Feb. 19, 2016, 11 pages.
Cearley et al, "Top 10 Strategic Technology Trends for 2016: Ambient User Experience," Feb. 26, 2016, 11 pages.
Walker et al., "Top 10 Strategic Technology Trends for 2016: Information of Everything," Feb. 26, 2016, 11 pages.
Plummer et al., "Top Strategic Predictions for 2016 and Beyond: The Future is a Digital Thing," Oct. 2, 2015, 27 pages.
Jones, Nick, "Top 10 IoT Technologies for 2017 and 2018," Jan. 22, 2016, 12 pages.
Geschickter et al., "Measuring the Strategic Value of the Internet of Things for Industries," Apr. 28, 2016, 14 pages.
Furlonger et al., "Toolkit: IoT Strategic Technology Map for Financial Services Initiatives," Dec. 2, 2015, 4 pages.
Furlonger et al., "Survey Analysis: Financial Services CIOs Should Not Ignore the Internet of Things," Mar. 17, 2015, 17 pages.
Moyer et al., "Measuring the Strategic Value of Financial Services IoT," Dec. 2, 2015, 10 pages.
Newton et al., "Gartner's Digital Banking Customer Advisory Framework," Jul. 7, 2016, 8 pages.
Moyer, Kristin R., "Industry Vision: Banks as Platforms," Apr. 22, 2016, 11 pages.
Moyer et al., "Industry Vision: Tipping Point for Banks as Platforms," May 3, 2016, 11 pages.
Moyer, Kristin R., "The Economics of Connections for Banking," Mar. 8, 2016, 12 pages.
Geschickter et al., "Survey Analysis: Early Adopters of Internet of Things Poised to Make 2016 the Year of the Customer," Feb. 12, 2016, 15 pages.
Lehong et al., "Building a Digital Business Technology Platform," Jun. 8, 2016, 21 pages.
Lowe's Holoroom, Virtual Reality for Retail—VisualCommerce, http://www.marxentlabs.com/ar-videos/lowes-holoroom-3d-augmented-reality-virtual-room-home-improvement/, 2014, 5 pages.
Wang et al., "Integrating BIM and augmented reality for interactive architecture visualization," Construction Innovation, Apr. 14, 2014, 16 pages.
West, "SierraHome Announces Custom Home 3D Design 4.0", http://www.gamezone.com/news/sierrahome_announces_custom_home_3d_design_4_0, Sep. 27, 2011, 1 page.
Cambria, "Envision the Possibilities With Cambria AR™" cambriausa.com [online]. Retrieved from the Internet: <https://www.cambriausa.com/Cambria-AR/>. Retrieved on Oct. 18, 2017, 7 pages.
IKEA, "The IKEA Home Planner," ikea.com [online]. Retrieved from the Internet: <http://www.ikea.com/ms/en_US/customer-service/about-our-products/planning-tools/index.html#>. Retrieved on Oct. 2, 2017, 3 pages.
Lee, "Ikea Place is an AR app that lets you put furniture on the street," The Verge [online]. Retrieved from the Internet: <https://www.theverge.com/2017/9/20/16339006/apple-ios-11-arkit-ikea-place-ar-app>, Sep. 20, 2017, 4 pages.

(56) References Cited

OTHER PUBLICATIONS

Modsy, "Try On Furniture in Your 3D Home," modsy.com [online]. Retrieved from the Internet: <https://www.modsy.com/. Retrieved on Oct. 2, 2017, 8 pages.
U.S. Appl. No. 15/802,806, "Property Enhancement Analysis," filed Nov. 3, 2017, 41 pages.
Denman, Selina, "Facing the future: virtual interior design reality in the home," Reference Location: ProQuest, May 17, 2017, 4 pages.
Busta, Hallie,"Three Augmented and Virtual Reality Apps for Design and Construction," http://www.architectmagazine.com/technology/products/three-augmented-and-virtual-reality-apps-for-design-and-construction_o, Aug. 27, 2015, 6 pages.
Yurieff, Kaya, "This shopping app lets you see a virtual couch in your real living room," http://money.cnn.com/2017/05/03/technology/houzz-3d-augmented-reality-shopping/, May 3, 2017, 4 pages.

\* cited by examiner

AUGMENTED OR VIRTUAL REALITY TO SCENARIO PLAN PROPERTY PURCHASE OR RENOVATION

BACKGROUND

When individuals look to build a new home or plan large-scale renovations to their home, financial impact analysis may be limited to understanding only the cost of the renovations or the cost of the build. Information regarding the long-term financial impact of a home purchase or renovation may also be important when making decisions related to home building or renovation, but not readily available. Oftentimes, such financial analysis is conducted after home designs are completed, requiring individuals to return to the design process over multiple iterations just to finalize a design that is within their budget.

SUMMARY

Embodiments of the disclosure are directed to methods and systems implemented by an augmented reality device or virtual reality device to assist individuals in understanding the financial impact of home renovations and new home builds.

In a first aspect, disclosed is a method for displaying renovation options. The method comprises: receiving homeowner financial information; receiving a selection of a renovation option; receiving pricing information of the renovation option; generating a financial impact analysis based on the homeowner financial information and the pricing information; displaying a renovation view on an augmented reality device, the renovation view displaying the structure with a representation of the renovation option depicted thereon; and displaying a financial impact analysis view showing the financial impact analysis, including a renovation budget amount.

In another aspect, disclosed is an augmented reality computing device. The augmented reality device comprises: a processing unit; and system memory, the system memory including instructions which, when executed by the processing unit, cause the augmented reality computing device to: receive homeowner financial information; receive a selection of a renovation option; receive pricing information of the renovation option; generate a financial impact analysis based on the homeowner financial information and the pricing information; display a renovation view on the augmented reality computing device, the renovation view displaying a structure with a representation of the renovation option depicted thereon; and display a financial impact analysis view showing the financial impact analysis, including a renovation budget amount.

In yet another aspect, disclosed is a system for displaying renovation options and financial impact analysis, the system comprising: a financial server; one or more third party servers; and an augmented reality computing device. The augmented reality computing device comprises: a processing unit; and system memory, the system memory including instructions which, when executed by the processing unit, cause the augmented reality computing device to: receive homeowner financial information from the financial server; receive a selection of a renovation option; receive pricing information of the renovation option from the one or more third party servers; generate the financial impact analysis based on the homeowner financial information and the pricing information; display a renovation view on the augmented reality computing device, the renovation view displaying a structure with a representation of the renovation options depicted thereon; and display a financial impact analysis view showing the financial impact analysis, including a renovation budget amount.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

The present disclosure is directed to methods and systems implemented by an augmented reality (AR) device or virtual reality (VR) device to assist individuals in visualizing property renovations or new property builds while simultaneously understanding the associated financial impact. For simplicity, the disclosure may refer to methods and systems as being applicable to existing home renovations, but aspects may also be applied to new property construction and/or renovations to properties other than homes, such as commercial buildings, etc.

In particular, embodiments of the present disclosure are directed to the use of an AR or VR device to visualize renovations and the simultaneous display of the financial impact to the homeowner. In an example, a homeowner may visually see renovation options (e.g., new flooring, cabinetry, windows, room reconfiguration, etc.) through the AR or VR device and simultaneously see the financial impact of those options. The financial impact may take into consideration the homeowner's budget. Furthermore, the financial impact analysis may be updated dynamically as the homeowner selects different renovation options.

The homeowner's financial impact analysis may be displayed simultaneously with the cost of the particular renovation option or combination of renovation options. For example, the AR or VR device may display the homeowner's renovation budget, credit options available to the homeowner based on the homeowner's renovation budget and the homeowner's credit score, monthly payment information, down payment information, tax information, etc. As described herein, such information may be updated dynamically as different renovation options are selected. Because the financial impact analysis takes into consideration the homeowner's budget, the financial impact analysis is personalized to the homeowner. Such personalization provides the homeowner with a useful and efficient way to select renovation options.

As also described, renovation options may be simultaneously displayed on the AR or VR device alongside the financial impact analysis. In an example, the AR device may enable the homeowner to walk through their home and visually see how a particular renovation would look, based on selected renovation options (e.g., a selection of new floors, cabinets, paint color, shelving, appliances, etc.). Accordingly, the systems and methods described herein provide homeowners with a personalized, informed, and efficient way to renovate an existing home or build a new home.

Figure 1:
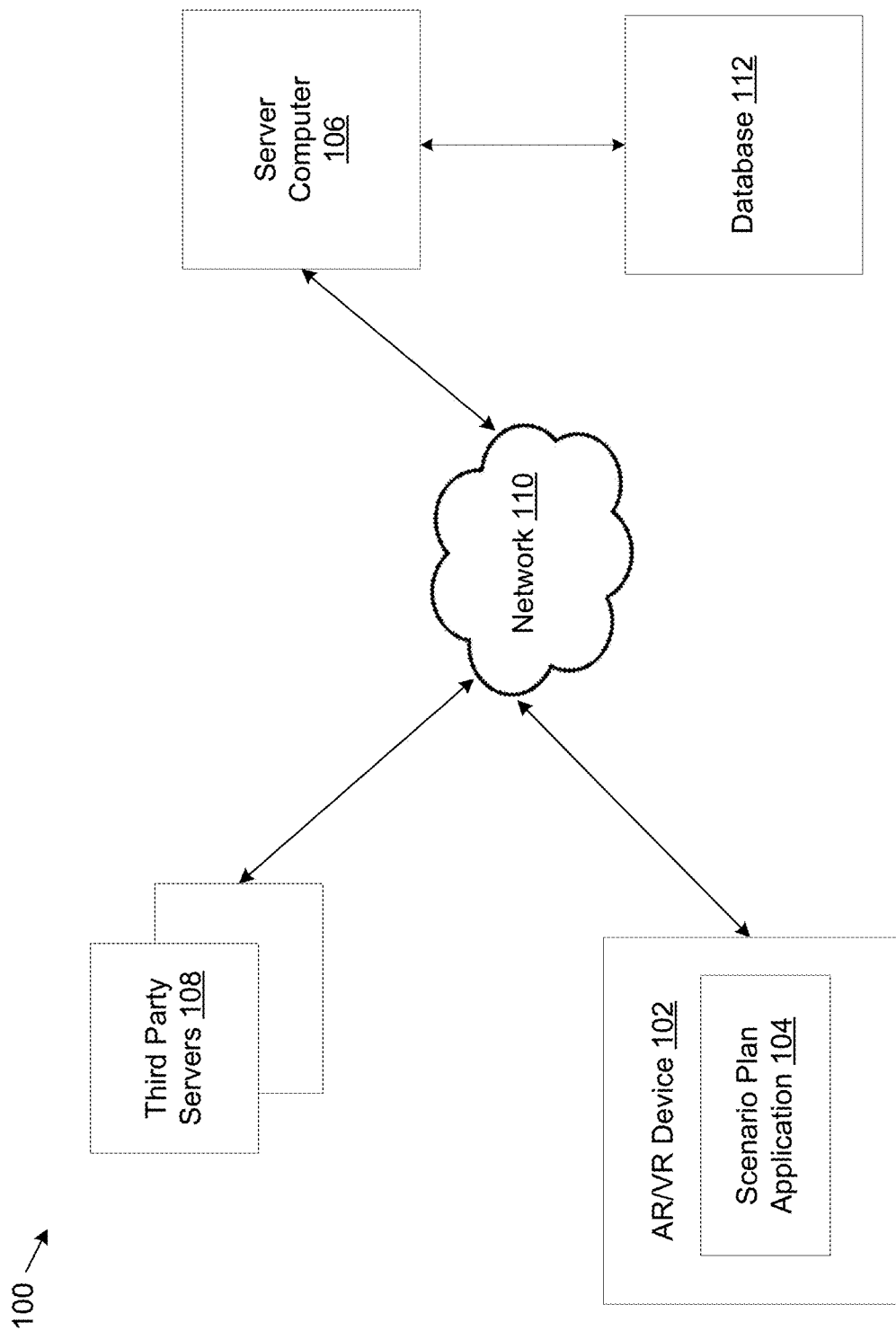
FIG. 1 illustrates an example system that can support the use of an augmented reality (AR) device or a virtual reality (VR) device in scenario home planning.

FIG. 1 illustrates an example system 100 that can support the use of an augmented reality (AR) device or a virtual reality (VR) device in scenario home planning.

The example system 100 includes a device 102, a server computer 106, and one or more third party servers 108, each connected to a communication network 110. Further include in this system 100 is a customer database 112 connected to the server computer 106. Additionally, a scenario plan application 104 may execute on the device 102.

In some embodiments, the device 102 is an electronic computing device with AR or VR functionality that can be worn or carried by the homeowner. An example of an AR device that may be worn by the homeowner is an AR headset. An example AR device that may be carried by the homeowner may be a smart telephone or tablet computer that includes AR components such as a processor, display, camera, and an AR software application. In such an embodiment, the smart phone or tablet computer may display a virtual image on a display screen of the smart phone or tablet computer.

In an example, the device 102 includes a processor, a camera, an optical display, and even a GPS device. The device 102 may further include wireless telecommunication capability, permitting a wireless communication to any of the servers and databases illustrated in FIG. 1. The device 102 may also include voice recognition capability, permitting the homeowner to direct the device 102 via voice commands. Alternatively or additionally, the device 102 may accept hand gestures, eye gestures, head gestures, or any combination thereof as commands to direct the device 102. The optical display projects virtual images and also permits the homeowner to see through the display. An example of a device 102 may be an AR headset such as Google Glass, from Google Inc. of Mountain View, Calif.

The example scenario plan application 104 is an application that can be installed on the device 102. Alternatively or additionally, the scenario plan application 104 can be installed remotely and executed by the device 102. In some embodiments, the scenario plan application 104 can display one or more renovation options and corresponding financial impact analysis on the display of the device 102.

In some embodiments, the scenario plan application 104 may generate renovation options to the user so that the user may select the category and type of renovation option. For example, the scenario plan application 104 may provide a user interface such that the homeowner may select the room in a home to visualize and associated renovation options. In some embodiments, the scenario plan application 104 may provide the user with options based on the particular room selected. For example, if the kitchen is selected, the scenario plan application 104 may provide options for cabinets, countertops, sinks, fixtures, flooring, backsplash, etc. In another example, if a bedroom is selected, the scenario plan application 104 may provide options for flooring, paint, wallpaper, curtains, etc.

In some embodiments, the scenario plan application 104 may query one or more of the third party servers 108 to request image information and pricing information corresponding to one or more renovation options selected by the homeowner. In some embodiments, the pricing information includes cost of material. In some embodiments, the pricing information also includes the cost of labor to install the renovation option. In some embodiments, the scenario plan application 104 may display the one or more images of the renovations as an overlay to the room the homeowner is viewing through the device 102.

The one or more third party servers 108 may be, for example, appliance stores, contractors, home improvement stores, etc. Accordingly, such third party servers 108 may provide the device 102 with one or more images that show how the home renovation will look based on a selected product.

In some embodiments, one or more third party servers 108 may be associated with real estate listing websites that provides home valuation information. Such information may be used by the scenario plan application 104 to evaluate the cost of renovation options and new home value information, etc.

The scenario plan application 104 may further query the server computer 106 to obtain the homeowner's financial information. As will be described in further detail herein, the server computer 106 and corresponding customer database 112 may belong to a financial institution of which the homeowner is a member. In some embodiments, the homeowner may provide the required authentication information via the scenario plan application 104, which may be used to access the homeowner's financial information. Such financial information may be retrieved from the customer database 112. Financial information will be described in further detail herein.

The example server computer 106 may be a server computer of a financial institution such as a bank. In some embodiments, the homeowner has one or more financial accounts at the financial institution. Server computer 106 can store financial records for the homeowner or at another server computer or database accessible from server computer 106 such as, for example, the customer database 112.

The example system 100 further includes a customer database 112. In some embodiments, the customer database 112 stores homeowner information such as, for example homeowner account information and homeowner financial information (e.g., renovation budget information, credit card information, savings account information, checking account information, etc.). In other embodiments, the customer database 112 stores additional customer information such as, for example, the customer's social media account information. As will be described herein, the scenario plan application 104 may retrieve financial information from the customer database 112 in order to generate a financial impact analysis of renovation options selected by the homeowner.

The customer database 112 may also store customer preferences such as, for example, the customer's style preferences, preferred third party providers, etc. The customer database 112 may also store information regarding the customer's budget in order to determine renovation options the homeowner can afford. Accordingly, the customer database 112 may store financial and other personal information of the homeowner.

In some embodiments, the scenario plan application 104 may generate the financial impact analysis based on the one or more renovation options selected by the homeowner and the homeowner's financial information. Generation of financial impact analysis will be described in further detail herein. In other embodiments, the scenario plan application 104 merely receives and displays the financial impact analysis on the display of the device 102.

In some embodiments, the homeowner may select a particular renovation option through the scenario plan application 104. In some embodiments, the scenario plan application 104 may order materials. Alternatively or additionally, the scenario plan application 104 may contact a contractor to install the selected materials.

Accordingly, the scenario plan application 104 may display renovation options on the device 102 alongside the corresponding financial impact analysis of the particular renovation option so that the user may visualize the renovation and the financial impact of the renovation.

Although in example embodiments, the scenario plan application 104 is described as providing certain functionality, it is understood that the disclosure is not intended to be limited to a particular configuration. Another server or server 106 may execute such functionality described above. In such an embodiment, the device 102 may display the images generated by such other device.

In some aspects, network 110 is a computer network such as an enterprise intranet and/or the Internet. The example network 110 may include a Local Area Network (LAN), a Wide Area Network (WAN), the Internet, wireless and wired transmission mediums. In further aspects, server computing devices as described herein may communicate with some components of the system 100 via a local network (e.g., an enterprise intranet), whereas such server computing devices may communicate with other components of the system 100 via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

Figure 2:
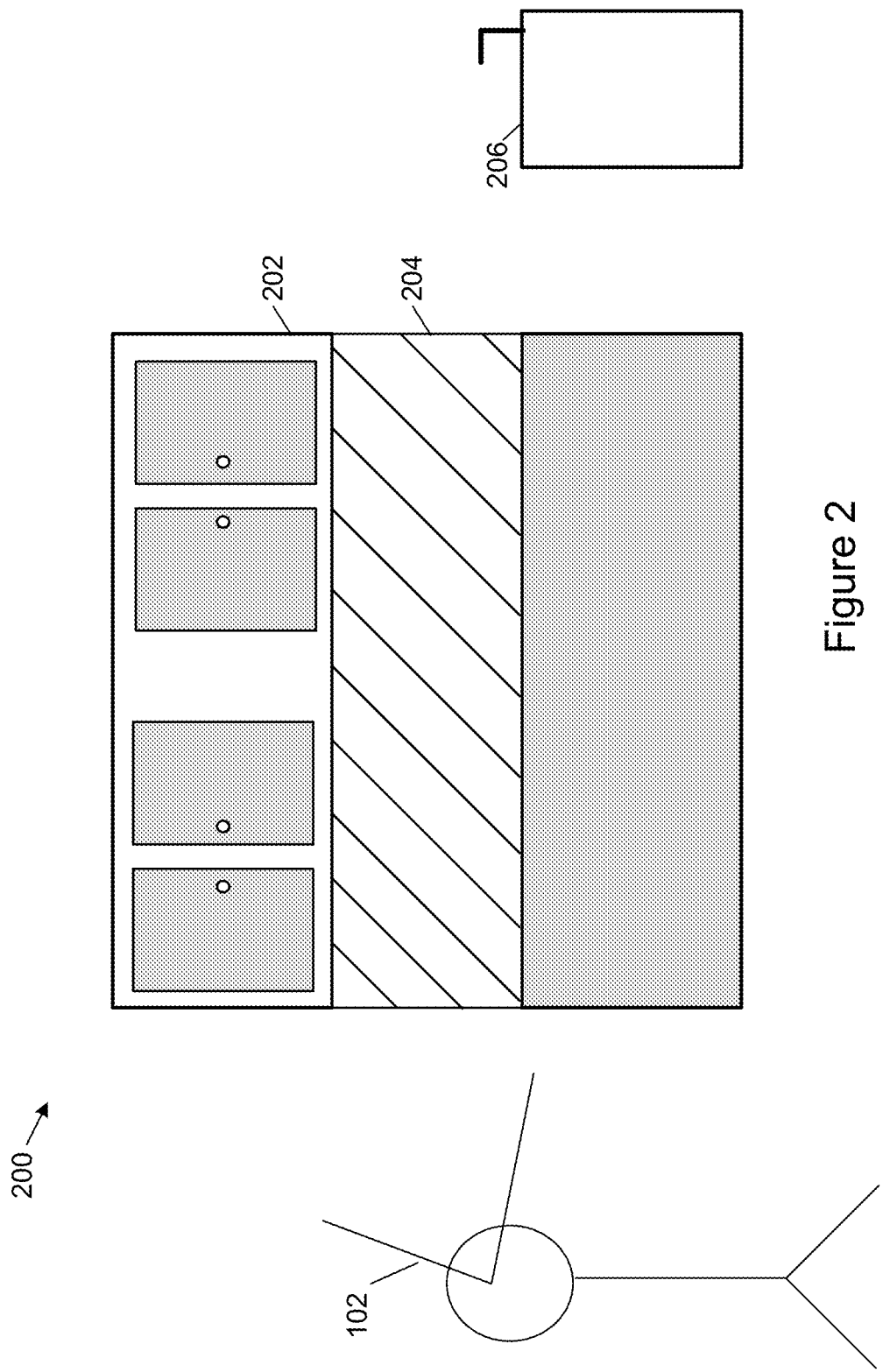
FIG. 2 illustrates an example scene of a homeowner's kitchen.

FIG. 2 illustrates an example scene 200 of a homeowner's kitchen.

In this example, the illustrated scene 200 shows a view of a homeowner's kitchen as it currently exists. The kitchen has original cabinets 202, an original backsplash 204, and an original sink 206. In some examples, the scene 200 is the actual homeowner's kitchen as visualized through the device 102 as the homeowner stands in his/her kitchen. In other examples, the scene 200 is a pre-recorded image of the kitchen.

As will be described in further detail herein, the homeowner may seamlessly walk through the home and visually see the renovation options to each room, the cost of each option (including a breakdown of costs for each individual option), and/or the corresponding financial impact analysis. As will also be described in further detail, financial impact analysis may describe the homeowner's budget, required credit for the selected one or more renovation options, and credit options. In other embodiments, financial impact analysis describes different financial information.

Figure 3:
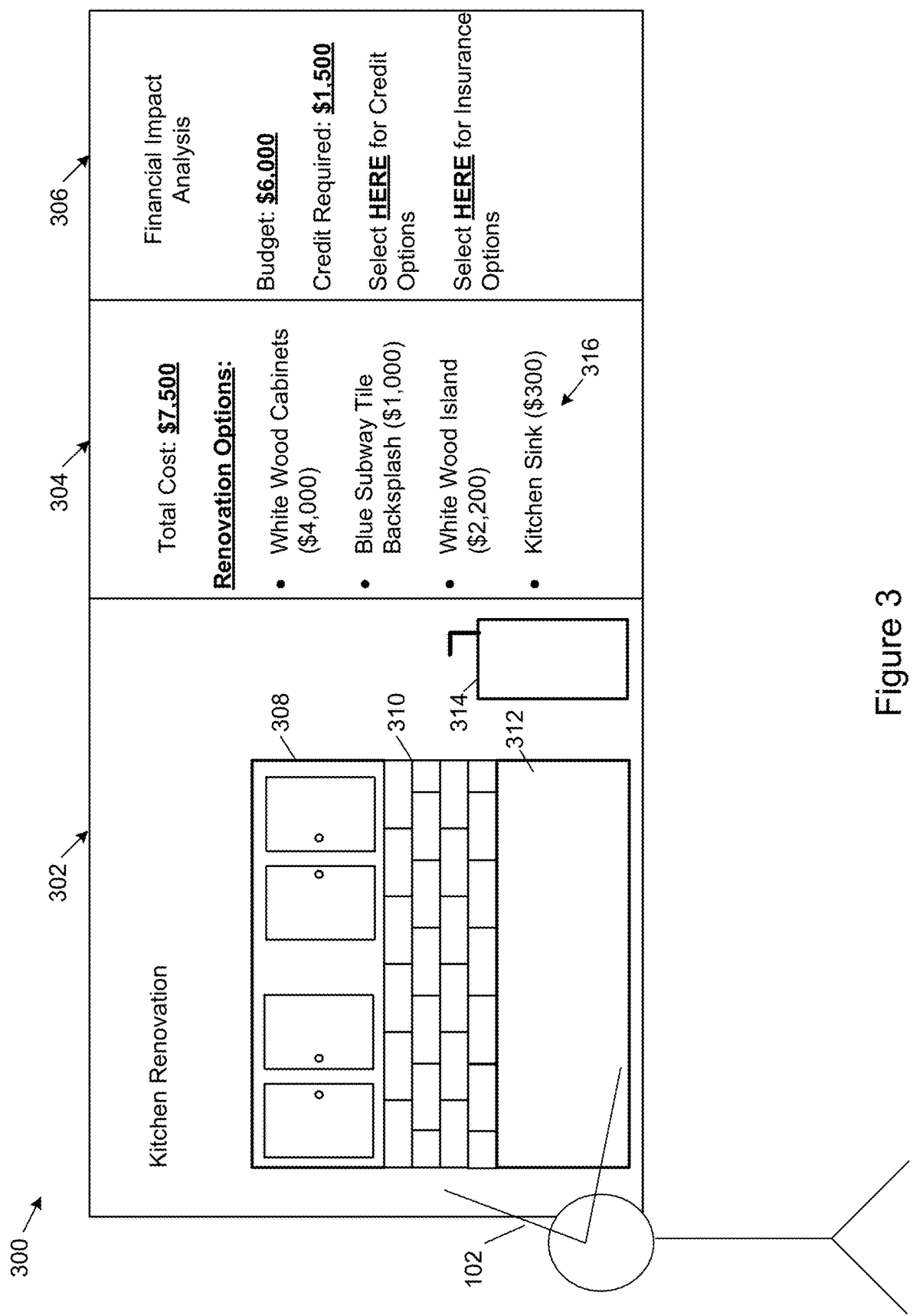
FIG. 3 illustrates an example scene as viewed from the device 102 of the system illustrated in FIG. 1.

FIG. 3 illustrates an example scene 300 as viewed from the device 102 of the system illustrated in FIG. 1.

In this example, the illustrated scene 300 is viewed from the homeowner's perspective through the device 102. The example scene 300 includes a renovation view 302 of the homeowner's kitchen, a cost view 304 of the selected renovation options, and a financial impact analysis view 306 of the selected renovation options as it pertains to the homeowner's budget.

As described herein, the device 102 may be a VR device or an AR device. Accordingly, the device 102 may include a processor, a camera, an optical display, and even a GPS device. The device 102 may further include wireless telecommunication capability, permitting a wireless communication to any of the servers and databases illustrated in FIG. 1. The device 102 may also include voice recognition capability, permitting the homeowner to direct the device 102 via voice commands. Alternatively or additionally, the device 102 may accept hand gestures, eye gestures, head gestures, or any combination thereof as commands to direct the device 102. The optical display projects virtual images and also permits the homeowner to see through the display. An example of a device 102 may be an AR headset such as Google Glass, from Google Inc. of Mountain View, Calif.

As described herein, the homeowner may visualize home renovations using the device 102. In the illustrated example, the scene 300 is shows a renovation view 302 of the homeowner's kitchen. Although the kitchen is shown in this renovation view 302, it is understood that the current disclosure is not intended to be limited to only the kitchen. The renovation view 302 can show any room of the homeowner's home.

As described herein with reference to FIG. 1, the device 102 may execute a scenario plan application (e.g., scenario plan application 104). The device 102 or scenario plan application 104 may be connected to a third party server (e.g., third party server 108). In some embodiments, the scenario plan application 104 may query one or more of the third party servers 108 to request image information and pricing information corresponding to one or more renovation options selected by the homeowner.

In this example embodiment, the scenario plan application displays, through the device 102, one or more images relating to renovation options selected by the homeowner as an overlay to the room the homeowner is viewing through the device 102. In particular, the example renovation view 302 displays the kitchen as the homeowner views it. The renovation view 302 allows the homeowner to select various renovation options to the particular room the homeowner is viewing.

In this example, the homeowner has selected renovation options for the cabinets 308, the backsplash 310, the island 312, and the kitchen sink 314. In one embodiment, the homeowner may swipe through various options and in another embodiment, the homeowner may select a type associated with the renovation option that would thereafter be displayed in the renovation view (e.g., the user may select the type "white wood cabinets"). In some embodiments, the homeowner may use hand gestures, voice, or eye movement to control the device 102 to display various renovation options. The renovation view 302 therefore displays the renovated view of the homeowner's kitchen so that the homeowner may visually see how the room would look with the selected options.

The cost view 304 shows the total cost of the selected options. The cost view 304 is a dynamic view that changes based on the one or more renovation options that the homeowner selected. As described herein, the one or more third party servers may provide cost information to the scenario plan application executing on the device 102. In this example, the cost view shows cost information of the selected material as well as an itemized description 316 of the selected renovation options. In this example, the itemized description 316 shows that the homeowner selected white wood cabinets, blue subway tile backsplash, a dark wood island, and a new kitchen sink. This itemized description 316 is by way of illustration only. The itemized description 316 may include more, fewer, or different options, depending on the one or more renovation options selected by the homeowner.

Alternatively or additionally, the cost view 304 may show cost information of labor to install the renovation option and tax information. In some embodiments, the cost view 304 may flag renovation options that are outside the homeowner's budget. In such embodiments, the cost view 304 may also show alternative yet comparable renovation options that are within the homeowner's budget. Furthermore, the cost view 304 may also show the name of the store, shop, or source from which the materials and labor originate. The homeowner may also have the option to select renovation options from a particular store, shop, or source.

The example financial impact analysis view 306 displays the financial impact of the selected renovation options to the homeowner. As described herein, the scenario plan application may retrieve the homeowner's financial information from a financial database (e.g., customer database 112) associated with a server computer (e.g., server computer 106) of the homeowner's financial institution. The homeowner's financial information is used to generate a financial impact analysis of renovation options selected by the homeowner. In some embodiments, the financial information may be the homeowner's renovation budget, which may be obtained from the various financial accounts of the homeowner. Alternatively or additionally, financial impact analysis may display financial information such as down payment information, monthly payment options (taking into consideration the homeowner's budget). Furthermore, financial information may further indicate the homeowner's credit rating and available credit from the financial institution.

As also described herein, the financial information retrieved from the customer database 112 may also store the homeowner's renovation preferences such as, for example, the customer's style preferences, preferred third party providers, etc. The customer database 112 may also store information regarding the customer's budget in order to determine renovation options the homeowner can afford. Accordingly, the customer database 112 may store financial and other personal information of the homeowner.

In some embodiments, the financial impact analysis view 306 displays the homeowner's budget and required credit. In this example, the required credit is a dynamic value that changes based on the renovation options and the homeowner's budget. In this example, the total cost of the renovation is $7,500 while the homeowner's identified renovation budget is only $6,000. Accordingly, in order to renovate the home according to the selected renovation options, the homeowner would require $1,000 in credit.

In some embodiments, the scenario plan application identifies one or more credit options available to the homeowner, as offered by a financial institution from which the homeowner may be a member. Accordingly, the financial impact analysis view 306 may further display such credit options available to the homeowner. In some embodiments, the scenario plan application may only identify available credit for which the homeowner is pre-approved. In such an example, the homeowner may seamlessly request such available credit using the device 102.

Alternatively or additionally, the financial impact analysis view 306 may display credit options for which the homeowner is not pre-approved. In such an example, the homeowner may apply for such credit directly from the device 102. Accordingly, the scenario plan application executing on the device 102 may connect to the server computer 106 of the financial institution over a network (e.g., network 110).

In yet other alternatives or additions, the financial impact analysis view 306 can also provide a custom analysis of the homeowner's finances and suggest options including a staged approach or a delayed approach for the renovations.

For example, if the total renovation costs significantly exceed the budget, the system can suggest some renovation options that can be performed now and other renovation options that can be performed in the future when additional monies become available. Such a configuration can take into account the homeowner's current and potential future finances, such as by analyzing the homeowner's typical cash flow.

Further or alternatively, the system can suggest a complete delay of the renovations until a later date. In such a scenario, the system can again take into account the homeowner's financial position. The system can, for example, suggest delaying the renovation for a period of time (e.g., six months, one year, etc., when the homeowner has saved additional monies) or until a specific date (e.g., late December when a bonus is typically received). Other configurations are possible.

In some examples, the financial impact analysis view 306 can optionally show insurance implications for the renovation as well. In such an example, the homeowner can select the "insurance options" item to receive information on how a renovation may affect insurance options for the renovation and/or structure. For example, if expensive appliances or other items are being added to the structure, the system may provide insurance options for those items. Similarly, if the property value is increased based upon the renovations, the system can do an analysis and indicate if the increased value might warrant an increase in property insurance. Other similar configurations are possible.

Accordingly, embodiments of the present disclosure enable the homeowner to visualize renovation options, the total cost associated with various options, and the financial impact of each option. Furthermore, embodiments easily provide the homeowner with ways in which to obtain credit, if necessary.

Figure 4:
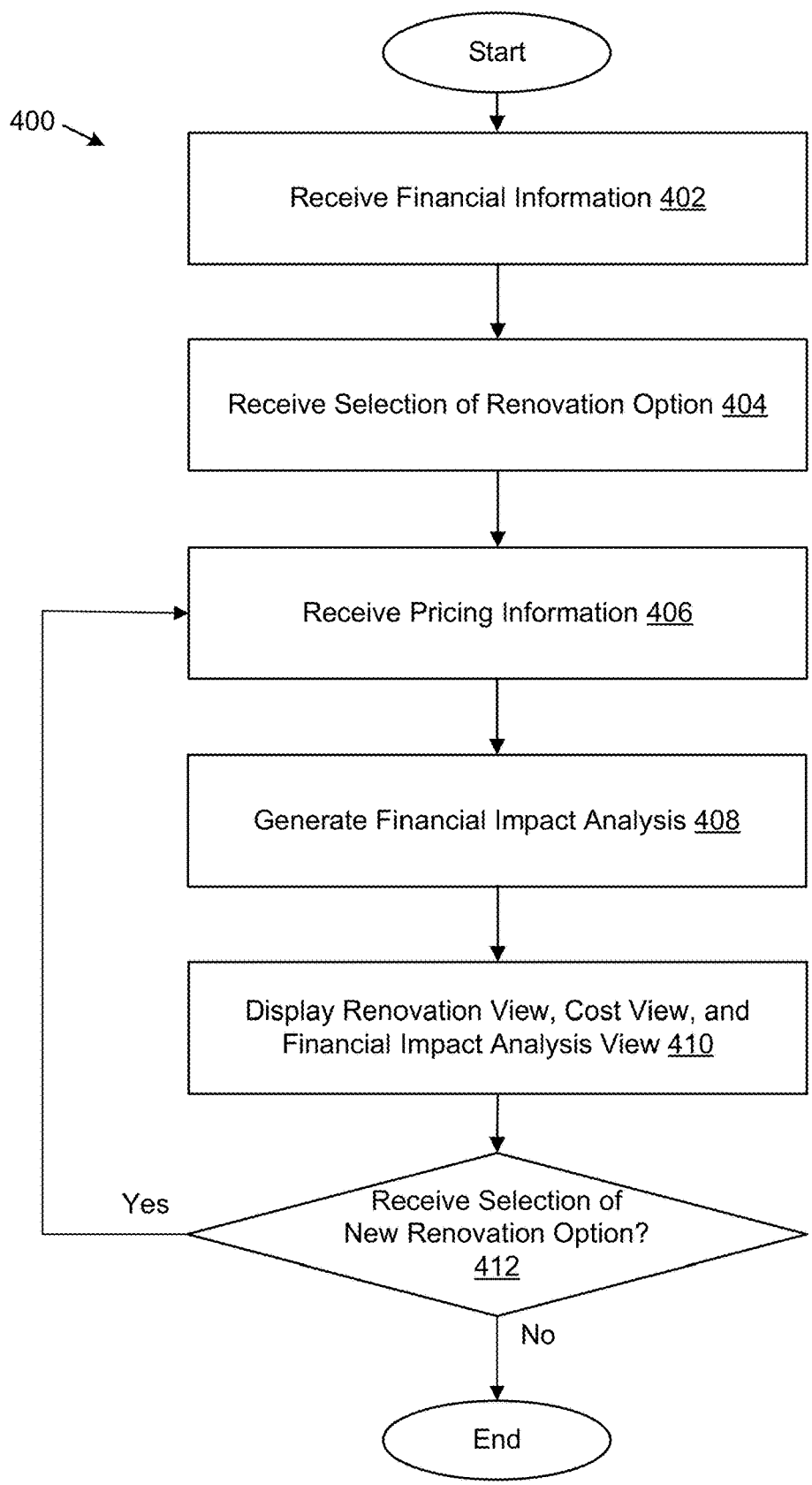
FIG. 4 illustrates an example method for displaying renovation options, associated cost, and financial impact analysis.

FIG. 4 illustrates an example method 400 for displaying renovation options, associated cost, and financial impact analysis.

Method 400 may be performed by the scenario plan application (e.g., scenario plan application 104 illustrated in FIG. 1). Method 400 begins at operation 402 in which the scenario plan application receives the homeowner's financial information. As described herein, the scenario plan application may communicate with a server (e.g., server 106 owned by a financial institution) in order to obtain the homeowner's financial information.

The obtained financial information may be, for example, information about the homeowner's renovation budget, savings account, checking account, and credit score. Other financial information may also be obtained.

In operation 404, the scenario plan application receives a selection of a renovation option. In an example, the homeowner, using the AR or VR device (e.g., device 102) may view a particular room of the homeowner's home and select renovation options. In an example, renovation options may relate to new flooring, cabinetry, countertops, paint colors, sinks, furniture, fireplaces, wallpaper patterns, etc.

In some embodiments, the scenario plan application may receive such renovation options from one or more third party servers (e.g., third party server 108). The one or more third party servers may be, for example, appliance stores, contractors, home improvement stores, etc. Accordingly, such third party servers may provide the scenario plan application operating on an AR or VR device with one or more images that show how the home renovation will look based on a selected renovation option.

In an example, the homeowner may have the option to select the store from which the particular renovation options may be purchased. Alternatively or additionally, the scenario plan application may automatically select one or more manufacturers or stores from which to obtain renovation options. In such an embodiment, the scenario plan application may select appliance stores, contractors, home improvement stores, etc. that are local to the homeowner. In such an embodiment, a global position system (GPS) of the AR or VR device may be used to determine the homeowner's location. Alternatively or additionally, non-local stores may also be used.

In some embodiments, the scenario plan application may query one or more of the third party servers to request image information corresponding to one or more renovation options selected by the homeowner. In some embodiments, the scenario plan application may display the one or more images of the renovations as an overlay to the room the homeowner is viewing through the device.

In some embodiments, the scenario plan application may generate renovation options to the user so that the user may select the category and type of renovation option. For example, the scenario plan application may provide a user interface such that the homeowner may select the room in a home to visualize and associated renovation options. In some embodiments, the scenario plan application may provide the user with options based on the particular room selected. For example, if the kitchen is selected, the scenario plan application may provide options for cabinets, countertops, sinks, fixtures, flooring, backsplash, etc. In another example, if a bedroom is selected, the scenario plan application may provide options for flooring, paint, wallpaper, curtains, etc.

In operation 406, the scenario plan application may receive pricing information from the one or more third party servers based on the selected renovation option. In some embodiments, the scenario plan application receives only the lowest price from one of the one or more third party servers. In other embodiments, the scenario plan application receives the price based on a selection of a particular store or manufacturer that offers the particular renovation option selected in operation 404.

In some embodiments, the scenario plan application may further obtain cost information of labor to install the renovation option. In some embodiment, the cost of associated taxes of the material and labor may also be obtained. Tax information may be generated based on the homeowner's location or address of the home.

In operation 408, the scenario plan application generates financial impact analysis. In an example, the financial impact analysis may be calculated by subtracting the total cost of the one or more renovation options selected by the homeowner (as obtained in operation 406) from the homeowner's renovation budget (as obtained in operation 402). Thus, the generated financial impact analysis illustrates the financial impact of the selected renovation options as it relates to the homeowner's financial information. Alternatively or additionally, the scenario plan application may generate additional financial impact analysis such as, for example, down payment information, monthly payment options (taking into consideration the homeowner's budget and credit).

In further embodiments, in generating the financial impact analysis, the scenario plan application may also determine one or more credit options available to the homeowner, as offered by a financial institution from which the homeowner may be a member. In some embodiments, the scenario plan application may only identify credit options for which the homeowner is pre-approved. Alternatively or additionally, the scenario plan application may identify credit options for which the homeowner is not pre-approved.

In operation 410, the scenario plan application may display, on the display of the AR or VR device, a renovation view, a cost view, and a financial impact analysis view. As illustrated in FIG. 3, the AR or VR device may simultaneously display such views such that the homeowner may visualize a renovation option or a combination of renovation options, the associated cost, and the financial impact. Accordingly, the scenario plan application may, in operation 410, simultaneously display such views on the display of the AR or VR device.

As described herein, the scenario plan application may display, in the renovation view, one or more images corresponding to the selected renovation options as an overlay to the room the homeowner is viewing.

As also described herein, the scenario plan application may display, in the cost view, the total cost of the selected one or more renovation options. In some embodiments, the cost view may also display the cost breakdown corresponding to each individual renovation option. In some embodiments, a description of the renovation option, and the store or manufacturer from which the materials may be purchased may also be identified. Alternatively or additionally, the cost view may also show the cost of labor to install the one or more selected renovation options.

As described herein, the financial impact analysis view may display the financial impact of the selected renovation options to the homeowner. In some embodiments, the financial impact analysis view displays the homeowner's budget and required credit. In an example, the required credit is a dynamic value that changes based on the renovation options and the homeowner's budget.

In some embodiments, the financial impact analysis view may further display credit options available to the homeowner. In some embodiments, the scenario plan application may only identify available credit for which the homeowner is pre-approved, while in other embodiments, other credit options are displayed. In some embodiments, the credit options are selectable and may open communication with the financial institution offering the credit so that the homeowner may request such credit from the scenario plan application.

In operation 412, the scenario plan application determines whether another renovation option is selected. If yes, the method 400 flows to operation 406 in which pricing information corresponding to the selected renovation option is obtained. If no, the method 400 ends.

Figure 5:
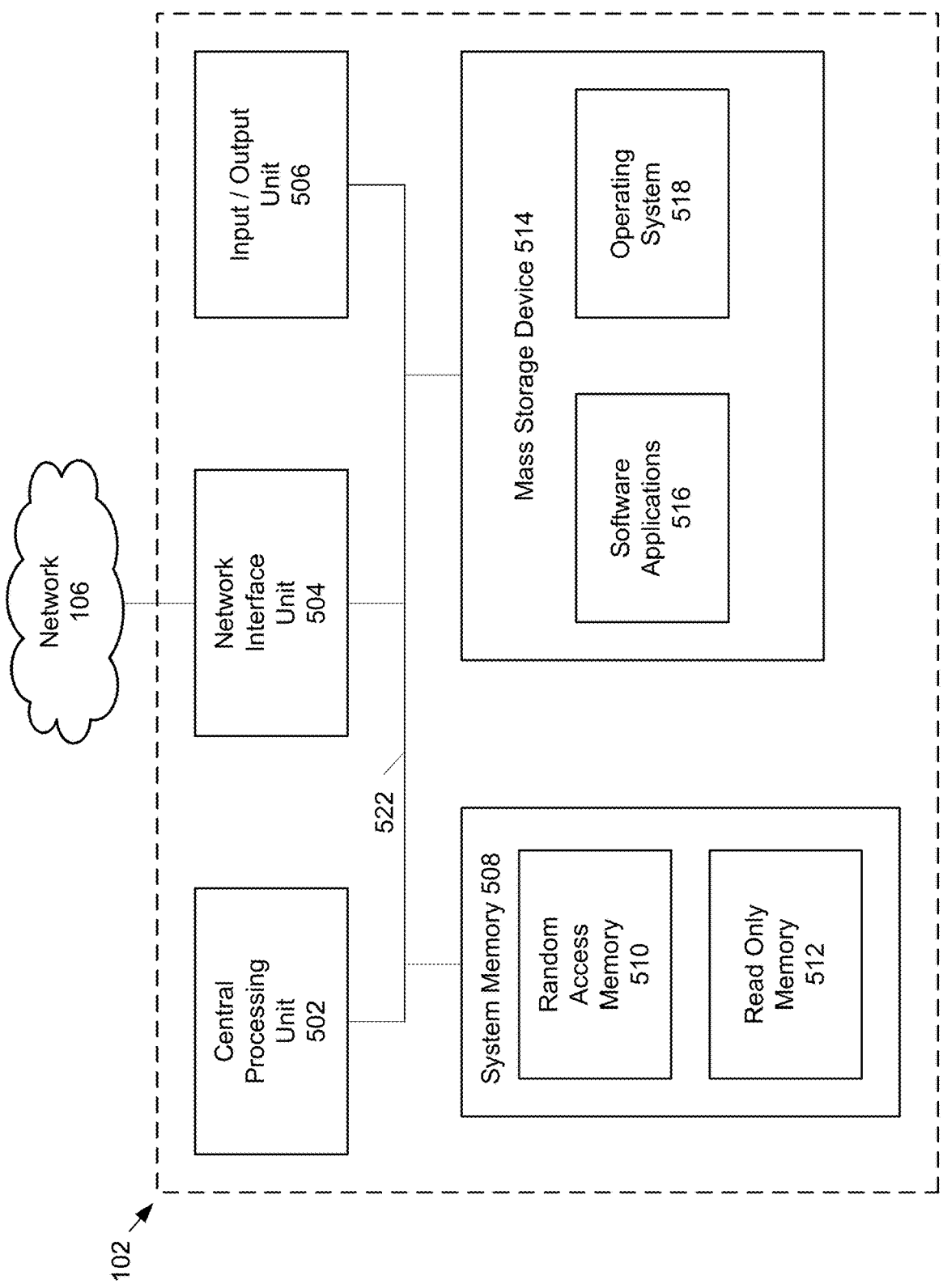
FIG. 5 illustrates example physical components of the AR or VR device illustrated in FIG. 1.

FIG. 5 illustrates example physical components of the AR or VR device 102 illustrated in FIG. 1. The server computer 106 can also include any or all of the components described below.

As illustrated in the example of FIG. 5, device 102 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements with, in the device 102, such as during startup, is stored in the ROM 512. The device 102 further includes a mass storage device 514. The mass storage device 514 is able to store software instructions and data. Some or all of the components of the device 102 can also be included in AR device 102.

The mass storage device 514 is connected to the CPU 502 through a mass storage controller (not shown) connected to the system bus 522. The mass storage device 514 and its associated computer-readable data storage media provide non-volatile, non-transitory storage for the device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the device 102.

According to various embodiments of the invention, the device 102 may operate in a networked environment using logical connections to remote network devices through the network 520, such as a wireless network, the Internet, or another type of network. The device 102 may connect to the network 520 through a network interface unit 504 connected to the system bus 522. It should be appreciated that the network interface unit 504 may also be utilized to connect to other types of networks and remote computing systems. The device 102 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the device 102 can store software instructions and data. The software instructions include an operating system 518 suitable for controlling the operation of the device 102. The mass storage device 514 and/or the RAM 510 also store software instructions, that when executed by the CPU 502, cause the device 102 to provide the functionality of the device 102 discussed in this document. For example, the mass storage device 514 and/or the RAM 510 can store software instructions that, when executed by the CPU 502, cause the device 102 to display received data on the display screen of the device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for displaying renovation options for a structure, the method comprising:
   receiving homeowner financial information of a homeowner;
   receiving a selection of a renovation option;
   receiving pricing information of the renovation option;
   generating a financial impact analysis based on the homeowner financial information and the pricing information; and
   simultaneously displaying on an augmented reality device:
      a renovation view displaying a representation of the renovation option as an overlay to a room that a user is viewing through the augmented reality device;
      a cost view comprising cost information of the renovation option; and
      a financial impact analysis view showing the financial impact analysis, including:
         insurance information showing how the renovation option may affect insurance options for the renovation option or associated structure;
         a homeowner renovation budget amount; and
         an amount of credit required for the renovation option.

2. The method of claim 1, wherein the pricing information is received from one or more third party servers.

3. The method of claim 1, wherein the financial impact analysis further comprises:
   displaying one or more credit options, wherein the one or more credit options are selected from a financial institution.

4. The method of claim 1, wherein the renovation view and the financial impact analysis view are each dynamically updated, and wherein the dynamic update corresponds to a selection of the renovation option.

5. An augmented reality computing device comprising:
   a processing unit; and
   system memory, the system memory including instructions which, when executed by the processing unit, cause the augmented reality computing device to:
      receive homeowner financial information;
      receive a selection of a renovation option;
      receive pricing information of the renovation option;
      generate a financial impact analysis based on the homeowner financial information and the pricing information; and
      simultaneously display on the augmented reality computing device:
         a renovation view displaying a representation of the renovation option as an overlay to a room that a user is viewing through the augmented reality computing device,
         a cost view comprising cost information of the renovation option; and
         a financial impact analysis view showing the financial impact analysis, including:
            insurance information showing how the renovation option may affect insurance options for the renovation option or associated structure;
            a homeowner renovation budget amount; and
            an amount of credit required for the renovation option.

6. The augmented reality computing device of claim 5, wherein the pricing information is received from one or more third party servers.

7. The augmented reality computing device of claim 5, wherein the financial impact analysis further comprises:
   display one or more credit options available, wherein the one or more credit options are selected from a financial institution.

8. The augmented reality computing device of claim 5, wherein the renovation view and the financial impact analysis view are each dynamically updated, and wherein the dynamic update corresponds to a selection of the renovation option.

9. A system for displaying renovation options and financial impact analysis, the system comprising:
 a financial server;
 one or more third party servers; and
 an augmented reality computing device, the augmented reality computing device comprising:
  an optical display configured to project virtual images and being at least partially transparent such that a user can see through the optical display;
  a processing unit; and
  system memory, the system memory including instructions which, when executed by the processing unit, cause the augmented reality computing device to:
   receive homeowner financial information from the financial server;
   receive a selection of a renovation option;
   receive pricing information of the renovation option from the one or more third party servers;
   generate the financial impact analysis based on the homeowner financial information and the pricing information; and
   simultaneously display on the optical display of the augmented reality computing device:
    a renovation view displaying a representation of the renovation options as an overlay to a room that a user is viewing through the optical display;
    a cost view comprising cost information of the renovation option; and
    a financial impact analysis view showing the financial impact analysis, including:
     insurance information showing how the renovation option may affect insurance options for the renovation option or associated structure;
     a homeowner renovation budget amount; and
     an amount of credit required for the renovation option.

10. The system of claim 9, wherein the financial impact analysis further comprises:
 display one or more credit options available, wherein the one or more credit options are selected from a financial institution.

11. The method of claim 1, wherein the augmented reality device is a wearable headset.

12. The augmented reality computing device of claim 5, further comprising a wearable headset.

13. The augmented reality computing device of claim 12, further comprising an optical display configured to project virtual images and being at least partially transparent such that a user can see through the optical display when the wearable headset is worn.

14. The system of claim 9, wherein the augmented reality computing device further comprises a wearable headset.

15. The method of claim 1, wherein the cost view further comprises an alternative option within the homeowner renovation budget amount.

16. The method of claim 1, wherein the financial impact analysis view further includes one or more pre-approved credit options in the amount of credit required for the renovation option.

17. The method of claim 1, wherein the financial impact analysis view further includes a suggestion to delay the renovations until a later date, wherein the suggestion takes into account the homeowner's financial position.

18. The method of claim 1, wherein the cost view further comprises name information describing a store, shop, or source from which materials and labor of the renovation option originate.

19. The method of claim 1, wherein receiving homeowner financial information includes receiving homeowner financial information from a server of a financial institution of the homeowner.

* * * * *